(12) United States Patent
Peltier

(10) Patent No.: US 7,717,658 B2
(45) Date of Patent: May 18, 2010

(54) BOLT ASSEMBLY

(75) Inventor: Bruno Peltier, St. Apollinaire (FR)

(73) Assignee: Tyco Electronics SIMEL SAS, Gevrey-Chambertin (FR)

( * ) Notice: Subject to any disclaimer, the term of this patent is extended or adjusted under 35 U.S.C. 154(b) by 144 days.

(21) Appl. No.: 11/927,071

(22) Filed: Oct. 29, 2007

(65) Prior Publication Data

US 2008/0101886 A1  May 1, 2008

(30) Foreign Application Priority Data

Oct. 30, 2006  (FR)  .................................. 06 54642

(51) Int. Cl.
*F16B 35/04* (2006.01)

(52) U.S. Cl. ........................ 411/411; 411/424; 411/383

(58) Field of Classification Search ......... 411/383–385, 411/1–5, 312, 411, 412, 424, 393–395, 417; 439/797, 462, 475

See application file for complete search history.

(56) References Cited

U.S. PATENT DOCUMENTS

| 3,963,322 | A | * | 6/1976 | Gryctko | ..................... 439/814 |
|---|---|---|---|---|---|
| 4,309,140 | A | * | 1/1982 | Steffen et al. | ................ 411/264 |
| 4,764,070 | A | * | 8/1988 | Baltzell et al. | ............... 411/430 |
| 4,810,148 | A | * | 3/1989 | Aisa et al. | .................... 411/383 |
| 4,955,773 | A | * | 9/1990 | Toth | ............................ 411/429 |
| 5,199,834 | A | * | 4/1993 | Seidl et al. | ...................... 411/5 |
| 5,395,196 | A | * | 3/1995 | Notaro | ........................ 411/396 |
| 5,569,008 | A | * | 10/1996 | Chapkovich | ................ 411/383 |
| 5,584,625 | A | * | 12/1996 | Petri | .............................. 411/5 |
| 6,042,430 | A | | 3/2000 | Hollick | |
| 6,116,832 | A | * | 9/2000 | Wolf et al. | ................... 411/383 |

FOREIGN PATENT DOCUMENTS

EP  1376764 A2  1/2004

* cited by examiner

*Primary Examiner*—Gary Estremsky
(74) *Attorney, Agent, or Firm*—Barley Snyder LLC

(57) ABSTRACT

A bolt assembly has a bolt body which includes a threaded portion and a shank; a head; a ring; and a shear zone. The head is configured to transmit rotary motion to the threaded portion through the shank. The ring is disposed on the shank and has a ring thread and a tab configured to ensure continuity between the ring thread and the threaded portion. The shear zone joins the shank to the threaded portion and a complementary recess, disposed on the threaded portion, is engageable with the tab to ensure rotation locking of the ring in relation to the threaded portion.

20 Claims, 2 Drawing Sheets

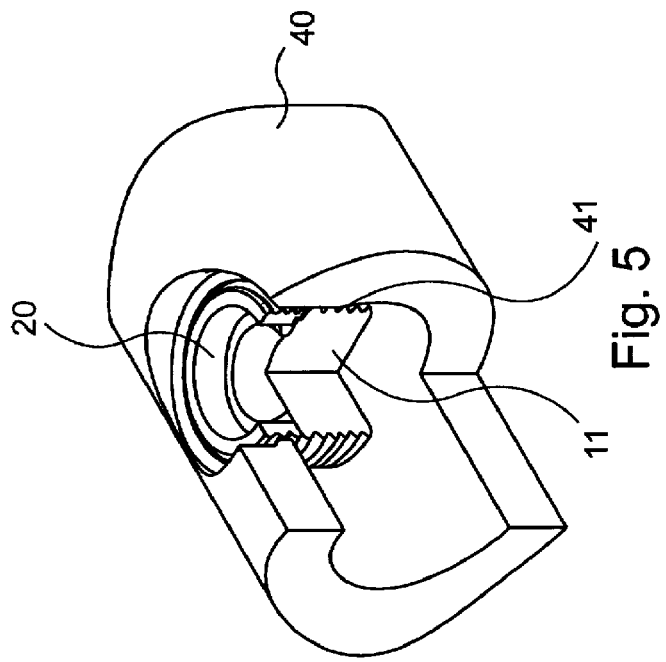
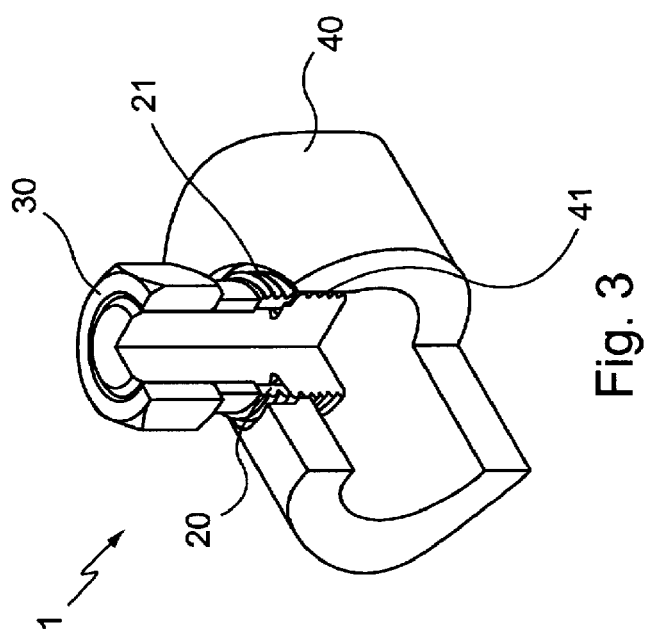
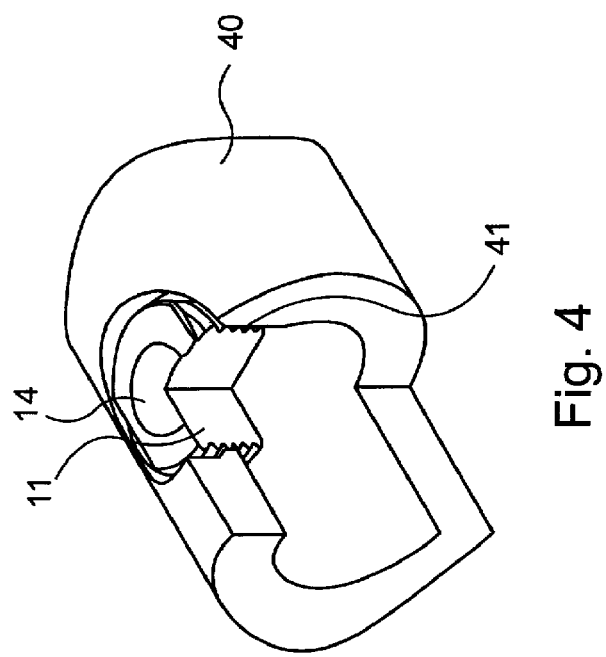

BOLT ASSEMBLY

CROSS-REFERENCE TO RELATED APPLICATION DATA

This application claims the benefit of the earlier filed parent patent application document FR 0654642 having a filing date of Oct. 30, 2006.

FIELD OF THE INVENTION

The present invention relates to the field of bolt assemblies.

BACKGROUND

Generally, in the technical field of bolt tightening, it is sometimes necessary to provide controlled shear bolts, for various technical reasons, for example, to limit the tightening torque of the bolt, to prevent its removal, or even to prevent the bolt head from protruding from the surface of the part in which it is installed, once tightening is complete.

Bolts having several controlled shear zones are sometimes useful, for example, when the bolt is required to be broken as closely as possible to the surface of the part in which it is installed, in relation to the depth of its installation. It is equally important that the maximum amount of female thread available on the part is in contact with the male thread of the bolt, in order to distribute the tightening forces better on the female thread and, consequently, on the part.

Such bolts are used, for example, to secure conductors to electrical connectors, for example, sleeve-type electrical connectors, designed to connect several conductors between them.

They are also used as clamping bolts to maintain electrical cables on anchoring or hanging clips disposed on electricity poles.

There are other bolts known from document EP 0819222 having several controlled shear zones. These controlled shear zones are realized by a plurality of grooves provided along the length of the threaded body of the bolt, and wherein the depth decreases towards the head of the bolt, so that the torque required to shear the bolt is greater around the head of the bolt than around its opposing free end. Therefore, there is a large number of shear "stages", so as to maximize the number of male threads engaged in the female thread, to distribute the tightening forces better. Moreover, these "stages" are used to minimize the protrusion of the bolt following installation.

In practice, this type of bolt poses several problems: on the one hand, these bolts are fragile, they may break during transportation, or when being handled during installation, and on the other hand, the threaded surface is reduced in so far as the grooves are made in the threaded portion of the bolt. The distribution of forces is thus deteriorated.

There are also other bolt assemblies known from document EP 1376764, having several controlled shear zones, without any loss of threaded surface. This involves a bolt assembly comprising a bolt body having a threaded portion at a free end from which protrudes a central shank having a plurality of controlled shear zones. At the free end of the shank, a head designed to be able to cooperate with a rotary drive tool has been provided to transmit rotary motion to the shank of the bolt body and, consequently, to the threaded portion. A plurality of threaded rings are disposed around the central shank. The rings are locked against rotation in relation to the shank due to its non-circular form and the complementary form of the rings. The thread of the rings are designed to merge with the threaded portion of the bolt body and are of a thickness such that the contact areas between two consecutive rings correspond to a shear zone found at the same level on the shank.

A major problem with these two types of controlled shear bolt assemblies resides in the fact that the shear zones must be designed so that the torque required to shear the bolt is greater around the head of the bolt than around its opposing free end.

In other words, the bolts must be dimensioned to break more easily when they have a low installation depth than when they have a high installation depth.

In practice, this means that, if a small element requires tightening, the bolt needs to be screwed in deeper than for a large element. Consequently, in the context of the two aforementioned documents, this means that small elements are tightened more than large elements.

Therefore, for example, in the field of tightening electrical cables in a connector, in order to meet the electrical and mechanical standards the tightening torques for these bolts will necessarily be oversized on some sections, because the tightening torque for the cable with the largest allowable section for a given connector will be the lowest shear torque for the whole of the bolt. The tightening torques for smaller cable sections will thus necessarily be higher, due to the design of these bolts.

In these circumstances, the tightening torque is sometimes so high in small-section cables that it can occur that a cable having a small diameter may break even before the bolt shears.

Another problem common to these two technical solutions resides in the fact that, when the shear zones are close to each other, the designer must provide low thickness shear zones, and which therefore have a low radius of curvature around the smallest diameter of the groove forming the shear zone.

In practice, it has been noted that low radii of curvature around the shear zones were locations of high stress concentrations and resulted in a less stable shear. These shear zones therefore have a wide shear torque tolerance interval. With regard to the user, this means a difference in shear torques between two identical bolts for an identical application.

SUMMARY

The present invention relates to a bolt assembly having a bolt body which includes a threaded portion and a shank; a head; a ring; and a shear zone. The head is configured to transmit rotary motion to the threaded portion through the shank. The ring is disposed on the shank and has a ring thread and a tab configured to ensure continuity between the ring thread and the threaded portion. The shear zone joins the shank to the threaded portion and a complementary recess, disposed on the threaded portion, is engageable with the tab to ensure rotation locking of the ring in relation to the threaded portion.

BRIEF DESCRIPTION OF THE DRAWINGS

The features and advantages of the invention will become apparent from the following description, which is provided for non-limiting illustration only, with reference to the appended Figures, wherein:

FIG. 3 is a perspective cut-away view of a bolt assembly according to FIG. 2, engaged in a complementary thread of a part, in an approach position, FIG. 4 is a perspective cut-away view of the same assembly in a shear position where a ring of the assembly has not engaged the complementary threads of the part and has been removed, and FIG. 5 is a perspective cut-away view of the same assembly in a shear position where a ring of the assembly has engaged the complementary threads of the part.

DETAILED DESCRIPTION OF THE EMBODIMENT(S)

Figure 2:
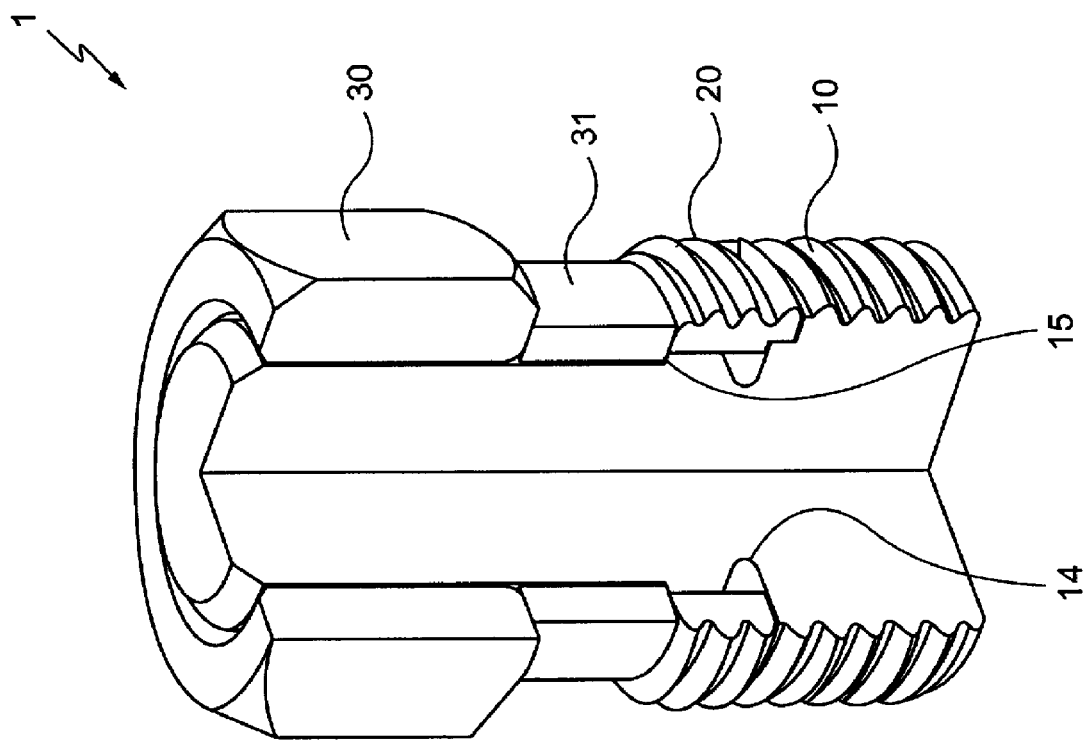
FIG. 2 is a cut-away view of the assembled bolt assembly according to FIG. 1.
Figure 1:
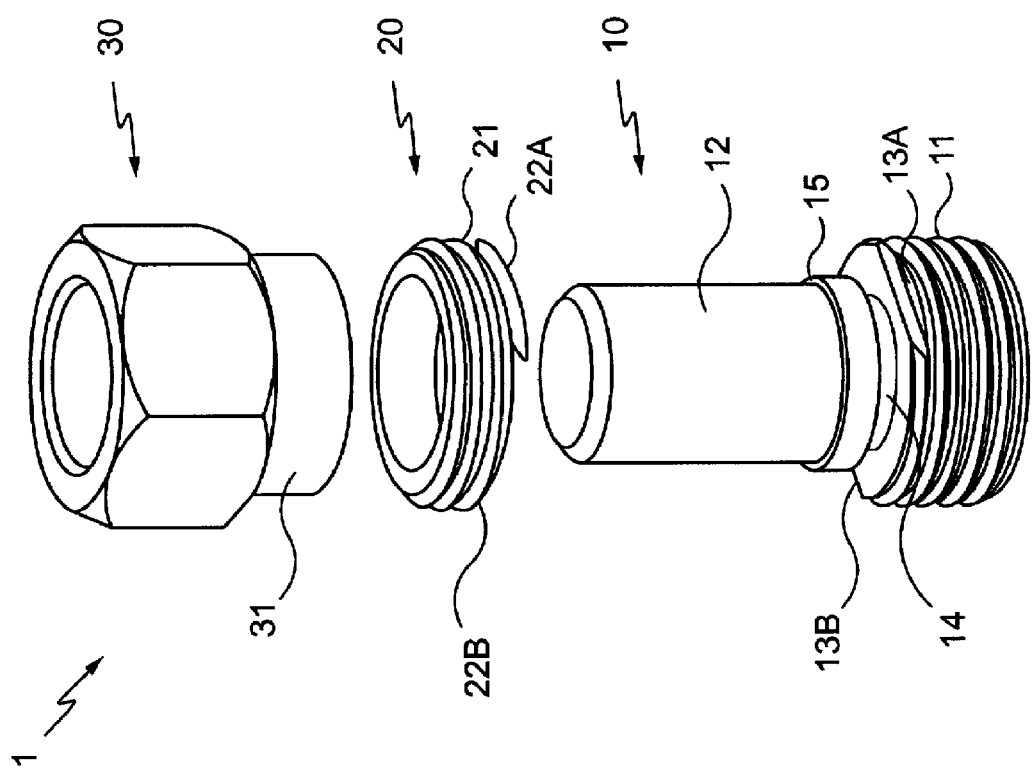
FIG. 1 is an exploded view of a bolt assembly according to the invention.

As can be seen especially in FIGS. 1 and 2, a bolt assembly 1 according to the invention comprises a bolt body 10, a ring 20, and an attached head 30.

The bolt body 10 comprises, at a free end, a threaded portion 11 from which a central shank 12 and a controlled shear zone 14 protrude, joining the shank 12 and the threaded portion 11. A collar 15 is provided on the shank 12 close to the shear zone 14.

The ring 20 is designed to be placed on the shank 12. The ring thread 21 of the ring 20 is provided to be continuous with that of the threaded portion 11 once the ring 20 is disposed on the shank 12. On the edge designed to be facing the threaded portion 11, the ring 20 further comprises first and second tabs 22A and 22B, respectively, each adapted to cooperate by engaging with the first and second complementary recesses 13A and 13B, respectively, provided in the threaded portion 11.

The head 30 is generally presented in the form of a hexagonal nut without female thread, designed to cooperate with a standard open-ended spanner for rotary drive, and is provided with a spacer 31. In the present embodiment, the head 30 is press-fit onto the shank 12, for example, using a press, in a tight fit, so as to transmit the rotation torque from the rotary drive tool to the shank 12 of the bolt body 10 and, consequently, to the threaded portion 11.

The position of the collar 15 is determined in order to limit the press-fitting of the head to a location where it contributes to ensuring a position without translation play in the ring 20 in relation to the threaded portion 11 of the bolt body 10. Therefore, the assembly may be screwed into a complementary thread without the risk of possible separation of the ring 20 and the threaded portion 11, and possible resulting damage to the ring thread 21.

In use, as shown in FIG. 3, the bolt assembly 1 is engaged into a complementary thread 41 of a part 40. In this case, the part 40 is a sleeve-type electrical connector. The bolt assembly 1 is then screwed in using a tool (not shown), which rotates the head 30 and, consequently, the shank 12 of the threaded portion 11 and the ring 20.

Once the predetermined tightening torque is reached, the shank 12 shears at the junction with the threaded portion 11 at the controlled shear zone 14, as shown in FIGS. 4 and 5. FIG. 4 illustrates a situation where ring thread 21 of ring 20 was not yet engaged in complementary thread 41 of part 40 at the moment shearing occurred in zone 14 and that ring 20 has been removed in order to reduce the obstruction on the outside of part 40. FIG. 5 shows illustrates a situation where ring thread 21 of ring 20 was engaged in complementary thread 41 at the moment shearing occurred in zone 14 and ring 20 thus remains in complementary thread 41 to contribute to the distribution of tightening forces thereon.

In the latter case shown in FIG. 5, it can be seen that the obstruction resulting from the bolt assembly 1 on the outside of part 40 is small and that the shear zone 14 is located a distance from the upper end of ring 20.

Alternatively, or in addition, to the aforementioned, the head is bonded, welded or pinned to the shank.

In an embodiment not shown, the rotation locking means are holes provided at the edges of each ring 20 and the threaded portion 11 of the bolt body 10, cooperating in pairs with at least one locking pin, in order to ensure the relative rotation locking of each ring 20 in relation to the threaded portion 11 of the bolt body 10.

In another embodiment not shown, the free end of the shank 12 is threaded and the head 30 is a nut designed to be screwed onto said free end of the shank 12.

In another embodiment not shown, the suitable means for cooperating with a rotary drive tool are provided in the bolt body 10, so as to allow unscrewing once the shearing has occurred. For example, a hexagonal socket is provided in the bolt body 10 to cooperate with an Allen key.

In another embodiment not shown, the head 30 is molded onto the free end of the shank 12 once the ring 20 is installed.

In another embodiment not shown, the head 30 is separable from the shank 12 and may be re-used once the shank 12 is broken.

According to the present invention, the shearing always occurs at the shear zone 14 and thus at the same predefined torque regardless of the installation depth of the bolt assembly 1 into part 40 or other receiving object. In practice, for example, in the context of an electrical connector, small-section cables will therefore be tightened using the same torque as large-section cables.

It will be noted that the groove in the shear zone 14 does not lose its threaded surface. Moreover, it can be seen that the designer is not geometrically limited when dimensioning the shear zone 14, and may particularly provide a relatively high radius of curvature for the base of the groove forming the shear zone 14. Therefore, as mentioned previously, the tolerance range for the tightening torque to shearing is improved.

Furthermore, it can be noted that it is practically impossible to break the bolt during transportation or when being handled during installation, insofar as the controlled shear zone 14 is protected by the ring 20 immediately next to the threaded portion 11 of the bolt body 10.

It will be appreciated that the bolt assembly 1, as previously described, may be used in conjunction with an electrical connector in order to secure electrical conductors and the use of a bolt assembly, as previously described, to maintain electrical cables on anchoring or hanging clips.

It can be seen that the use of a bolt according to the invention is not limited to the technical field of anchoring electrical conductors, but is applicable to all bolt tightening fields in general, including the fastening of anti-theft devices in vehicles (steering column, gear lever locking mechanisms, etc.).

It should be noted that numerous modifications or variants of the bolt assembly 1 example according to the invention, as previously described and shown, may be easily performed by a person skilled in the art without deviating from the scope of the invention.

What is claimed:

1. A bolt assembly, comprising:
    a bolt body having a threaded portion at a free end and a shank extending from the threaded portion;
    a head configured to transmit rotary motion to the threaded portion through the shank;
    a ring having a ring thread and a tab, the ring being disposed on the shank with the shank extending through an opening of the ring and configured to ensure continuity between the ring thread and the threaded portion;
    a shear zone joining the shank to the threaded portion; and a complementary recess disposed on the threaded portion and being engageable with the tab to ensure rotation locking of the ring in relation to the threaded portion.

2. The bolt assembly according to claim 1, wherein the tab and the complementary recess are formed at edges of the ring and threaded portion, respectively, to ensure relative rotation locking the ring in relation to the threaded portion.

3. The bolt assembly according to claim 1, further comprising a plurality of the tabs and a plurality of the complementary recesses.

4. The bolt assembly according to claim 1, wherein the head is attached to the shank.

5. The bolt assembly according to claim 4, wherein the head is press-fit onto the shank in order to act as a translation stop for the ring in relation to the shank.

6. The bolt assembly according to claim 5, wherein a collar is provided on the shank to limit the displacement of the head when the head is attached to the shank, to a position where the head contributes to preventing translation of the ring in relation to the threaded portion.

7. The bolt assembly according to claim 5, wherein the head is bonded, welded or pinned to the shank.

8. The bolt assembly according to claim 5, wherein the free end is threaded and the head is a nut configured to be screwed onto the free end.

9. The bolt assembly according to claim 4, wherein the head is bonded, welded or pinned to the shank.

10. The bolt assembly according to claim 9, wherein the free end is threaded and the head is a nut configured to be screwed onto the free end.

11. The bolt assembly according to claim 9, wherein a collar is provided on the shank to limit the displacement of the head when the head is attached to the shank, to a position where the head contributes to preventing translation of the ring in relation to the threaded portion.

12. The bolt assembly according to claim 4, wherein the free end is threaded and the head is a nut configured to be screwed onto the free end.

13. The bolt assembly according to claim 4, wherein a collar is provided on the shank to limit the displacement of the head when the head is attached to the shank, to a position where the head contributes to preventing translation of the ring in relation to the threaded portion.

14. The bolt assembly according to claim 7, wherein a collar is provided on the shank to limit the displacement of the head when the head is attached to the shank, to a position where the head contributes to preventing translation of the ring in relation to the threaded portion.

15. The bolt assembly according to claim 2, wherein the head is attached to the shank.

16. The bolt assembly according to claim 3, wherein the head is attached to the shank.

17. The bolt assembly according to claim 1, wherein the head is molded onto the shank after the ring is disposed on the shank.

18. The bolt assembly according to claim 2, wherein the head is molded onto the shank after the ring is disposed on the shank.

19. The bolt assembly according to claim 1, wherein the bolt body is configured for interaction with a rotary drive tool to allow unscrewing of the bolt body after shearing has occurred at the shear zone.

20. The bolt assembly according to claim 1, wherein the bolt assembly is used in conjunction with an electrical connector to secure an electrical conductor.

* * * * *